though this office 3,435,535
Patented Apr. 1, 1969

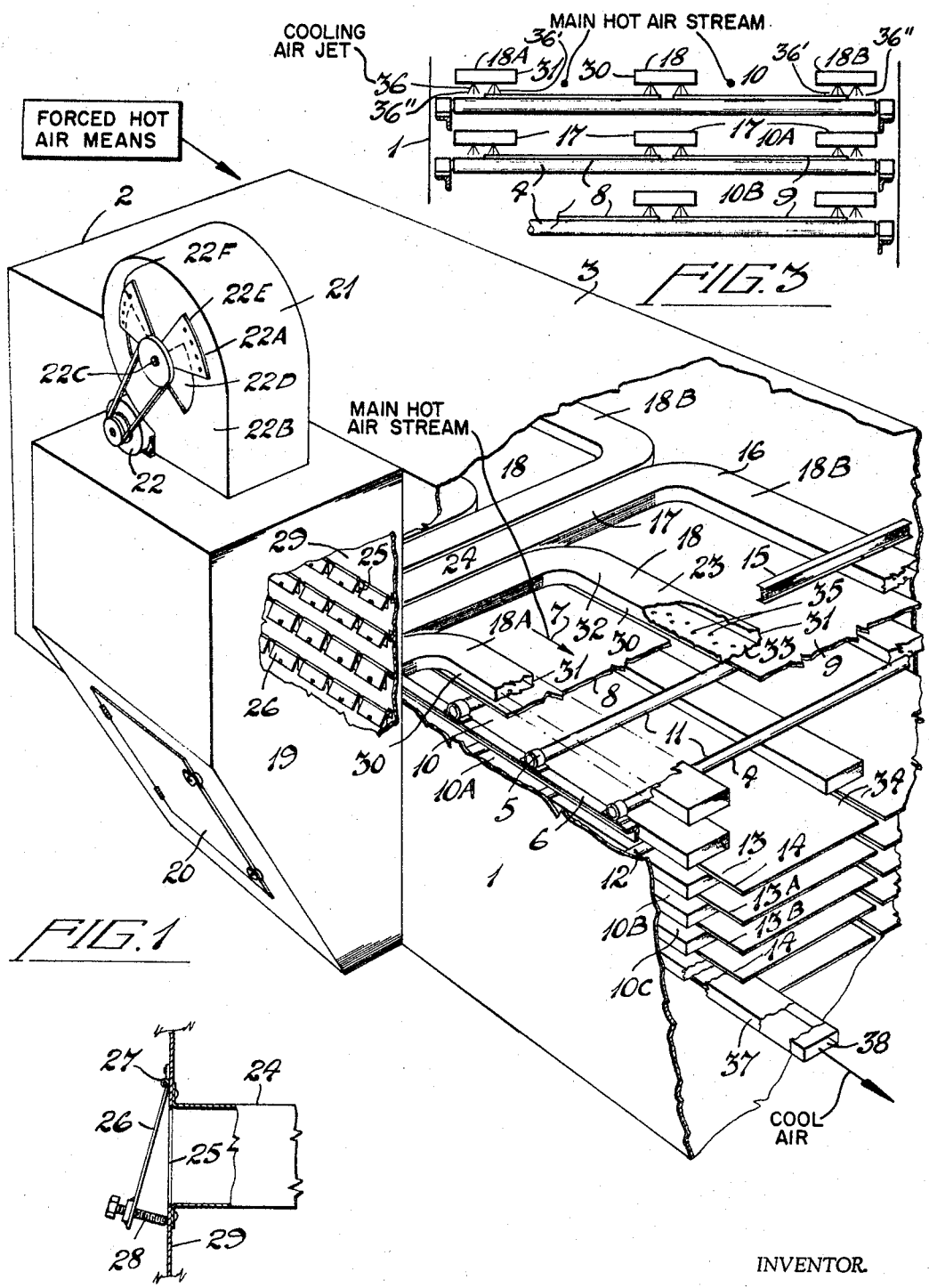

3,435,535
MEANS AND METHOD FOR CONTROLLING THE EDGE-DRYING OF GYPSUM WALLBOARD
Robert C. Blair, 53 Victoria Embankment, Nottingham, Nottinghamshire, England
Continuation of abandoned application Ser. No. 596,729, Nov. 23, 1966, which is a continuation of abandoned application Ser. No. 362,270, Apr. 24, 1964. This application Dec. 4, 1967, Ser. No. 687,918
Int. Cl. F26b 3/04, 13/04
U.S. Cl. 34—7                           8 Claims

ABSTRACT OF THE DISCLOSURE

In a tunnel type drying oven for wallboard transversely spaced parallel ducts apertured upon the underside, extend longitudinally therein, and over the edges of wallboard being transported through the oven whereby to deliver elongated flanking curtains of cooling air along the wallboard edges and substantially confine a current of drying air between the side curtains to prevent edge overdrying.

---

The instant application is a continuation of application Serial No. 596,729 filed in Nov. 23, 1966, and now abandoned, which is a continuation of application Ser. No. 362,270 filed Apr. 24, 1964, and now abandoned.

The present invention relates to a novel means and method for controlling the drying of the longitudinal marginal areas including the edges of gypsum wallboard, an object being to provide structure of the character herewithin described by means of which the overdrying and consequent calcination, or tendency theretoward, may be avoided, so that, instead, the board throughout its width may be more uniformly dried than has hitherto been possible.

More particularly an object of the present invention is to provide a means and method whereby the longitudinal marginal edges of gypsum board being dried are protected against the overdrying effects of the conventional main or central stream or current of hot air moving against the surfaces of the board, in such a way that there is no liability of the described means either damaging the board through unintended contact therewith, or of accidental obstruction such as might cause a damaging situation to occur within the drying oven.

A further object is to provide means and a method for achieving the stated objects which is conspicuously simple to purchase, install, service, and remove for access when necessary, the same comprising essentially a system of relatively cool air ducting which is served from a main header or manifold in communication with a fan through which the volume of admitted air may be varied according to differing conditions such for example as the thickness of wallboard being dried.

A further object is to provide means and a method whereby in addition to the main body of air admitted to the system being variable as stated in the last preceding paragraph, the volume of air admitted to the individual ducts composing said system may be varied according to the environing circumstances, such as board-thickness, temperature, humidity and the like, but particularly for the purpose of controlling the distribution of air between the inner and outer edges of wallboard proceeding through the oven, and such wallboard as proceeds through the oven on various horizontal levels, so that the effective condition of the edges of wallboard on each level are the same.

A further object is to provide means and a method whereby air volume admitted as indicated in the last two preceding paragraphs may be varied quickly and easily having regard to the location and structure of the valves concerned in this connection.

Further objects flowing from the last stated, are, according again to environing circumstances, to provide ducts which are either perforated and closed-ended whereby air-jets may be cause to impinge on the board at or adjacent one or both its longitudinal moving edges, or in the alternative, imperforate, and open-ended, with which latter arrangement colder air may, again according to circumstances, be directed therethrough, than when the ducts are perforated, to be discharged at their open ends into the main air-drying stream of the system as will be more fully described hereinafter.

An object flowing from the last preceding paragraph is accordingly to provide means whereby the edges of wallboard may either be cooled by convection, in other words by the transmission of a cooling medium (air) from air jets with which the ducting-system herein described is punctured, or by radiation when the ducting is imperforate, in the sense that the cooling air therein will radiate from the ducting surfaces and thus cool the warmer surrounding air and particularly the warm wallboard-edges, and in either form with the consumption of only a small amount of energy, being that which is required for the purpose of driving air through the associated pump (fan).

With the foregoing objects in view, and such other as may become apparent as this specification proceeds, the present invention consists in the following arrangement and construction of parts, all as hereinafter more particularly described, reference being had to the accompanying figures in which:

FIGURE 1 is a fragmentary perspective representation of a conventional tunnel drying oven of the type employed for removing excess moisture from a stack of gypsum wallboards therein.

FIGURE 2 is a vertical, fragmentary cross-sectional representation of one of the adjustable baffles or gate-valves capable of adjusting the degree of opening or closure of the admitting port to the several edge shielding and fluid current conveying ducts employed in the present invention.

FIGURE 3 is a fragmentary schematic representation showing three board conveying and drying passageways of a conventional tunnel drying oven in transverse cross-section, and depicting the present invention relative to boards moving through the said oven.

In the drawings, like characters of reference designate similar parts in the several figures.

The manufacture and drying of gypsum-cored board, commonly known as wallboard is well known. It has been widely described in printed publications pertaining to this art, such for example as in the following United States patents: Vance, 1,656,802, Jan. 17, 1928; Powers et al., 2,573,344, Oct. 30, 1951; Dailey, 3,017,306, Jan. 16, 1962; and Loechl, 3,088,218, May 7, 1963.

Essentially therefore it is only deemed of possible assistance herein to outline the method of wallboard manufacture as follows:

A slurry of calcined gypsum is poured under controlled conditions onto a lower covering sheet or ply of protective paper which forms the underside of the wallboard. Simultaneously with such pouring, an upper ply is fed downwardly from above. The upper paper ply is somewhat narrower than the lower one onto which the slurry is precipitated. This slurry is composed of calcium sulphate hemihydrate plus approximately four time the amount of water which is theoretically required to convert it to the dihydrate form. This excess of water is required to ensure that complete conversion to the dihydrate form is achieved. However, the excess must be removed by drying without reaching such temperatures as will remove the water of combination from the dihydrate. As the process (which is continuous) proceeds, the slurry is squeezed outwardly to the desired width of the wallboard to be formed, between the said upper and lower plies and while the outer elongated edges of the lower ply are turned upwardly and inwardly over the outer edges of the upper ply. The aforesaid squeezing to requisite thickness of a given run of wallboard is governed by a pair of horizontally disposed, upper and lower "press rolls." After passing through the press rolls, the board with its core of gypsum slurry is supported on a belt, and between bars which constitute a fence to preserve edge-precision while the gypsum is setting. The outer overlapping edges of the lower paper ply are of course secured to the upper ply by adhesive means.

The wallboard now moves slowly along the belt, and when a sufficiency of set has been reached, further initial setting continues with the board supported solely on rollers. The board is then transversely pricked and guillotined at predetermined intervals prior to being moved onto a return table at which general location the boards are stacked into eight or more or less superposed layers separated by rollers. The space between each platform of parallel and transversely arranged rollers is herein called a passageway. Within each passageway one or more boards may be arranged to lie in side by side relationship according to the width being manufactured at the time. In such stacked arrangement the boards proceed longitudinally through elongated drying ovens or kilns of generally tunnel design. The several ovens are arranged in a continuous series of two or three or more. Each may be considered as a zone of progressively decreasing temperature. Air circulated through each oven by an intake fan and caused to pass through a set of burners is circulated through the several superposed passageways comprising the aforesaid ovens. FIGURE 1 of the accompanying drawings represents the first or hottest oven as employed at the "wet-end" of the series, to the extent necessary to illustrate the means and method and constituting the present invention for controlling the edge-drying of board moving therethrough.

In connection with the said drawings, it is to be understood that stacked boards which have become fully set, but are still wet (as this term is understood in the art) commence moving through the first oven collectively designated 1, from the end generally designated 2. The oven comprises an elongated and substantially rectangular housing 3 within which are layers of parallel, spaced, and transversely disposed rollers 4 journalled in the bearings 5 mounted on supporting bars 6. As already indicated there may be several layers of such rollers each layer being in superposed relationship. One or more wallboards are caused to move slowly in the direction of arrow 7 upon the rollers 4. In FIGURE 1 two wallboards 8 and 9 are illustrated as moving through each passageway, side by side. It is again emphasized that in this description the expression "passageway" is considered to comprise the elongated space 10, 10A, 10B, 10C . . . between each horizontal transverse lineup or deck 11 of rollers 4, and the next adjacent deck of such rollers as for example that indicated as 12 in the accompanying FIGURE 1.

Within each passageway heated air, as indicated by "forced hot air means" in block form, is forced in the form of a main stream or current in the direction of arrow 7, with the legend "main hot air stream," from a fan usually positioned above the oven 1. This air is recirculated upwardly at the end of each zone, to be returned through the burners mentioned, and as a result loses the moisture with which it has become more or less saturated, through a conventional exhaust stack, to be forced through the passageways repeatedly thereafter in the manner aforesaid. During each circuit the heated air takes off some of the moisture from the boards 8 and 9 moving along the passageways. However, since the marginal surface areas 13, 13A, 13B . . . , including actual edges or edge portions 14 offer a great susceptibility per cubic inch of superficial area for the evaporation of moisture therefrom, it follows that such marginal areas and edges tend to become overdried, and friable which is sufficient to render the whole gypsum core and board as-a-whole commercially unacceptable.

Because of the excessive moisture removal at and about the longitudinal edges of wallboards, various means have been proposed to prevent it. All such means as are known to this applicant are however operationally impracticable for one reason or another. In the aforementioned patent to Loechl for example longitudinally extending and vertically disposed metal sheets with dependent and upwardly projecting curtain portions of flexible fabric or rubber are provided to complete fully enclosed lateral tunnels for the protection of the marginal areas of the wallboard from the excessively hot draught of the main stream air, and moistening sprays are provided within each such tunnel, secured to the walls of the oven. An objection to this arrangement may however reside in the fact the the provision of such completely isolated lateral tunnels as are depicted in Loechl's FIGURES 4 and 5 might be ineffective due to isolating of the marginal areas and edges of the wallboard too effectively from the warmth of the main stream air. The Loechl proposals appear to embody considerable interior structure which would render access difficult into the narrow vertical confines of each passageway. Additionally the proposals would appear to be insusceptible to ease of adjustment in contrast to the novel structure shortly to be described. Lastly, in this context, my own experiments with the use of cooling water have been unsuccessful, and the edge over-drying problem in wallboard production, has not, to my knowledge, been solved prior to use of the present invention.

A further proposal for protecting the marginal edges of wallboard against over-drying is embodied in the U.S. Patent No. 1,730,629 to Rule. In this instance elongated baffles overlie the wallboard-edges. Such a proposal would appear to be completely incapable of adjustment. Furthermore, it should be remarked that the wallboards moving along with the passageways sometimes tend to lie slightly askew. When in pairs they sometimes ride more closely together than at other times and sometimes separate. The elongated baffles or streamers of Rule appear to be inflexible and damage to the wallboards not to mention other troubles could well ensue should the wallboards get out of line with respect to the Rule invention.

The Powers et al. patent (supra) contemplates transversely suspended trailers (laterally adjustable) which blanket the marginal areas and edges of the wallboard, a lineup of such means being contemplated as depicted in FIGURE 3 of the said patent. These too, as in Rule, trail the wallboard in its movement through the passageways. A variety of objections appear to exist with respect to the proposal however such as difficulty of installation, insusceptibility to adjustment, and, as in the case of Loechl and Rule, the possibility of too complete an isolating of the marginal areas so that in contrast to being overdried, they are insufficiently dried which again could very well impair the commercial acceptability of the final product.

The present invention does not suffer from the above noted objections and has been found to provide means whereby an excellent uniformity of drying-rate occurs for the whole width of the board or boards moving within each passageway. The said invention is therefore accordingly embodied in the structure described as follows:

Supported within the oven 1 by any suitable simple means such as the spaced, parallel, transverse channels 15, in each of the passageways 10 is a system of ducts collectively designated 16 through which relatively cool air may travel. An array of six ducts for each passageway is designated collectively 17. From an inspection of this array, it will be seen that two pairs of three ducts each, 18, 18A, and 18B, branch in opposite directions from a header 19 provided with an access door 20 which header constitutes generally means for delivering cooling air into said ducts. Positioned upon the header is a volute housing 21 containing a fluid pump in the form of a fan driven by motor 22.

A main air inlet and damper assembly collectively designated 22A is located upon the volute wall 22B of housing 21. The said assembly may be of any desired form, and as exemplified is shown to be concentric with fan spindle 22C, and to comprise a pair of diametrically opposed sectorial openings 22D capable of being covered or uncovered to any extent desired by the sectorial damper panels 22E. Any means may be designed for securing the said panels in relationship to the openings 22D such as the provision of a set of apertures 22F through which a retaining pin may be passed to register with an aperture (not shown) therebehind.

The main air inlet and damper assembly just described is provided primarily to control the extent to which edge-cooling is to be applied to the ducts 16 considered as a collectivity, and will vary according to such conditions as to the thickness of board presently being dried. At this point it may be noted that for an eight-passage stack (or an eight-deck stack) each containing the array of six ducts as stated, or a total of forty-eight ducts, it has been found that a five horse power fan is sufficient.

As will be clearly apparent by reference to the accompanying FIGURE 1, that each individual duct 23 extends parallel with the longitudinal axis of the oven 1, the only deviation from such parallelism being in the vicinity of the aforesaid header where all the ducts are horizontally right-angulated as indicated generally by numeral 24 for communication with the header via the ports 25. A gate-valve 26 hinged at 27 is capable of closing or opening each port, and by best reference to the accompanying FIGURE 2 will be seen to be capable of micro-metric adjustment through the agency of the screws 28 designed to bear against the interior wall-portion 29 of the header. The gate valves 26 are for the specific purpose of controlling the distribution of air between the inner and outer edges and marginal areas of the wallboard as will presently be apparent, since the moisture-factor of these may differ.

The transverse cross sectional configuration of each of the ducts 23 will be seen to be shallow and rectangular thus comprising narrow vertical sidewalls 30 and 31, together with an imperforate cover-wall 32, and a perforated under-wall 33. In this context it should however be added that under certain circumstances it may be found desirable to perforate coverwall 32 for the discharge of air upwardly therethrough against the underside marginal areas of the wallboard 8 or 9. The present invention should therefore not be construed as limited to perforation of the under-wall.

Ducts 18A and 18B are designed to overlie and overlap the marginal surface areas 13 of the wallboard moving in each passageway, and to be slightly spaced above such surface areas. The central duct 18 overlies the inner marginal areas and edges 34 in the same horizontal plane as ducts 18A and 18B. Obviously when single wallboard of full width according to the capacity of the oven 1 is being manufactured, the valves 26 permitting the entrance of cooling air into the central ducts 18 will be closed. And generally speaking, it may be said that the valves regulating the entrance of air into the central ducts 18 will be more nearly closed than those which govern the entrance of air into the outer ducts 18A and 18B for the reason that less overdrying tends to occur at the inner marginal areas 34 than at the outer ones 13.

When it is realised that wallboard generally speaking moves through the oven 1 at a rate of some 4 feet per minute, and the main stream hot air moves through the passageways 10 at approximately five hundred feet per minute to carry off a very considerable volume of unbound water at the wet-end of the oven system, the problem solved by the present invention in respect to edge-overdrying is of considerable practical significance. This problem is solved by the provision of ducts, and a system of superposed arrays of ducting as described wherein the under-walls 33 of each duct are provided with a plurality of apertures 35 to permit air jets 36, indicated in FIGURE 3 with the legend "cooling air jet," to be expelled downwardly so as to impinge upon the marginal areas 13 and 34 and against and around the edges such as 14 of the wallboard. The effect of the multiplicity of air jets 36 is to form side curtains 36' as a partial barrier to the main or central hot air streams of each passageway and to form jets of air 36" directed toward the board edges so that the hot air streams become mixed with the cool air flowing from the apertures 35 therefore and the temperature of the air is reduced at the locations near the edges of the wallboard.

In addition, the opposed side-walls 30 and 31 assist in restricting the main current of air from the wallboard edges. Next the covering walls 32 function as a partial blanket against the burning effect which can be so damaging particularly in the wet-end oven. And in this connection reference is again made to the fact that, according to circumstances, imperforate ducts such as those expressly designated 37, may be employed, in which all wall-portions will be imperforate, such ducts being however open-ended as at 38 so that air, as indicated by the legend "cool air" and the arrow, and again according to circumstances, cooler air than that employed when the ducts are perforated, or air moving at a greater velocity, may be discharged into the main air-drying stream moving in the direction of the afore-mentioned arrow 7.

Thus the present invention modifies the effect to the main stream hot air upon the edges of the wallboard in the four ways just stated—but without baffling back and restricting the hot air so completely as to contact only the wallboard surface which is intermediate with respect to the marginal areas—or cooling the said hot air in the vicinity of the wallboard edges too efficiently so that they are insufficiently dried.

It should be added that when the cooling ducts described are imperforate so that cold air is passed out through the ends 38 thereof, the effect is to cool the wallboard-edges and marginal areas by convection or radiation; in other words by the proximity of a cool body to a warm one. Further, although in a gas fired drying oven, the main source of heat is in the recirculating gases of combustion, a substantial heating of the boards is derived from conduction in other words by contact, between the wallboards and the drier rollers 4. In steam-heated drying ovens where steam radiators are positioned between the boards, radiation effects are largely responsible for the heat transfer. It is to be understood that the present invention is equally applicable to both types of drying oven.

Since various modifications can be made to the novel subject-matter herein, without departing from the inventive concept which the same embodies, it is not intended that protection of this invention by Letters Patent should be interpreted as restricted to the particular modification or modifications thereof particularly described and exemplified.

What is claimed as new is:

1. In the oven drying of gypsum board, the method for improving the uniformity of drying of the board across its width, comprising the steps of providing substantially continuous cooling surfaces adjacent and overlying the longitudinal marginal edges of the board and spaced therefrom and maintaining said surfaces at a lower temperature than said marginal edges and in radiant heat receiving relation with respect thereto.

2. In the drying of gypsum board in an oven with a circulating stream of drying air, the method of improving the uniformity of drying of the board across its width, comprising the steps of at least partially restricting said stream to a longitudinal channel of a width less than that of the board, providing cooling surfaces adjacent the longitudinal marginal edges of the board and spaced therefrom and maintaining said surfaces at a lower temperature than said marginal edges and in radiant heat receiving relation with respect thereto.

3. In the drying of gypsum board in an oven with a circulating stream of drying air, the method of improving the uniformity of drying of the board across its width, comprising the steps of passing air cooler than the longitudinal marginal edges of the board through ducts overlying said marginal edges and spaced therefrom and in radiant heat receiving relation with respect to said marginal edges, directing a plurality of jets of air from said ducts toward the board edges and between said edges and the center of the board, thereby restricting at least a part of said drying stream to a longitudinal channel of a width less than that of the board and between said ducts and the jets issuing therefrom and confining the air of the jets to the surfaces of the board in the area of said marginal edges.

4. In the drying of gypsum board in an oven with a circulating stream of drying air, the method of improving the uniformity of drying of the board across its width, comprising the steps of establishing downwardly flowing side curtains of air positioned interiorly of the side edges of the board, and restricting with said curtains at least a part of said stream to a longitudinal channel of a width less than that of the board.

5. In the drying of gypsum board in an oven with a circulating stream of drying air, the method of improving the uniformity of drying of the board across its width, comprising the steps of forming air curtains from a plurality of jets of air along each longitudinal board edge and between said edge and the center of the board, and restricting at least a part of said stream to a longitudinal channel of a width less than that of the board and between said curtains.

6. In the drying of gypsum board in an oven with a circulating stream of drying air, the method of improving the uniformity of drying of the board across its width, comprising the steps of discharging a plurality of jets of air to form an air curtain along each longitudinal board edge and between said edge and the center of the board, restricting at least a part of said stream to a longitudinal channel between said curtains and of a width less than that of the board, and confining the air of the curtains to the surface of the board in the area of said marginal edges.

7. In a gypsum board drying apparatus of the tunnel drying oven type provided with a longitudinal passageway for a wallboard therethrough and having means to supply a current of drying air flowing longitudinally through said passageway, the improvement comprising a pair of transversely spaced parallel imperforate ducts extending longitudinally in said passageway and located to overlie the side edge portions of a board in the passageway and to be spaced vertically therefrom, said ducts being shallow vertically and relatively wide horizontally, and means for delivering cooling air into said ducts whereby to provide cool duct members overlying the board side edge portions to protect the board side edge portions against overdrying.

8. In a gypsum board drying apparatus of the tunnel drying oven type provided with a longitudinal passageway for a wallboard and having means to supply a current of drying air flowing longitudinally through said passageway, the improvement comprising a pair of transversely spaced parallel ducts extending longitudinally in said passageway and located to overlie the side edge portions of a board in the passageway and to be spaced vertically therefrom, said ducts being shallow vertically and relatively wide horizontally, and means for delivering cooling air into said ducts, said ducts being provided with apertures facing said side edge portions of the board and distributed along said ducts and in a number sufficient to provide side curtains of ducted air thereat whereby to reduce contact of said current of drying air with said board side edge portions.

References Cited

UNITED STATES PATENTS

| 2,573,355 | 10/1951 | Powers et al. | 34—216 XR |
| 2,996,811 | 8/1961 | Loechl | 34—7 XR |
| 3,088,218 | 5/1963 | Loechl | 34—205 XR |
| 3,216,491 | 11/1965 | Brown et al. | 165—120 XR |

JULIUS E. WEST, *Primary Examiner.*

ALLAN D. HERRMANN, *Assistant Examiner.*

U.S. Cl. X.R.

34—13.4, 155, 205